R. L. BENGE.
WEEDER.
APPLICATION FILED FEB. 17, 1913.
1,082,222.
Patented Dec. 23, 1913.
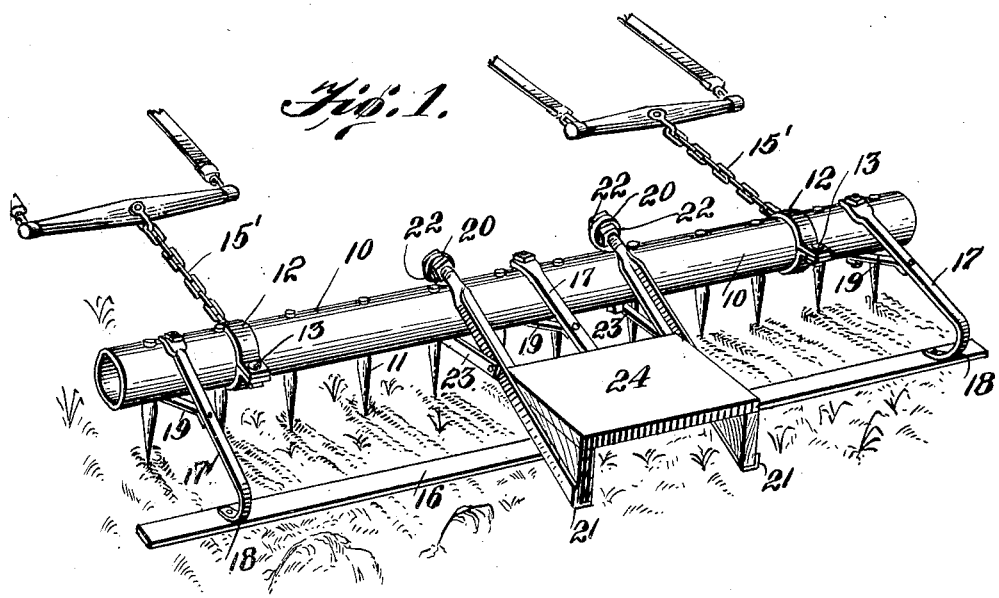
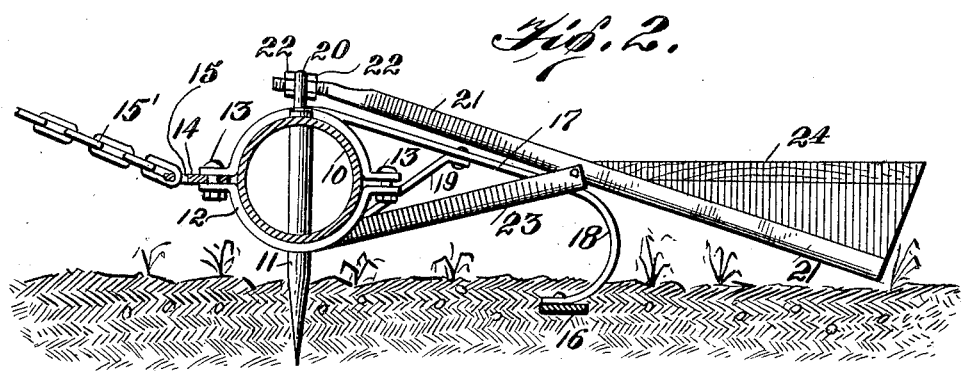
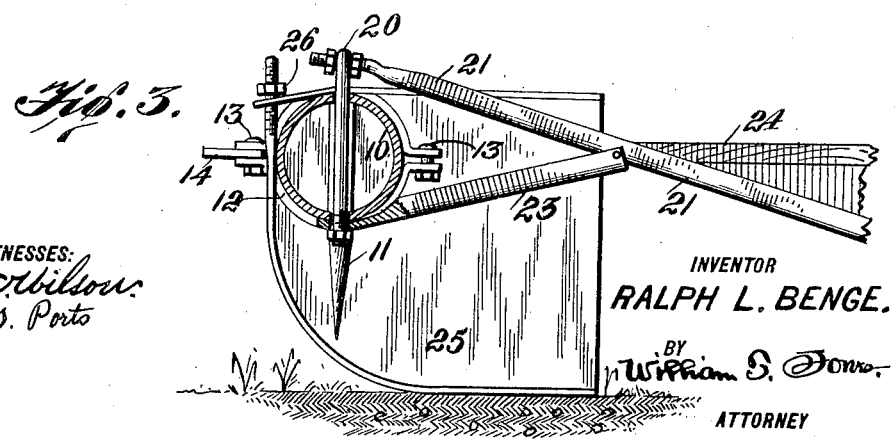
WITNESSES:
INVENTOR
RALPH L. BENGE.
BY
ATTORNEY

UNITED STATES PATENT OFFICE.

RALPH L. BENGE, OF LEXINGTON, OREGON.

WEEDER.

1,082,222. Specification of Letters Patent. Patented Dec. 23, 1913.

Application filed February 17, 1913. Serial No. 748,996.

*To all whom it may concern:*

Be it known that I, RALPH L. BENGE, a citizen of the United States, residing at Lexington, in the county of Morrow and State of Oregon, have invented certain new and useful Improvements in Weeders, of which the following is a specification.

My invention relates to improvements in weeders and has for its object the provision of a device which is simple and efficient in operation, durable in construction and adjustable to meet various surface conditions.

To these and other ends, the nature of which will be readily understood as the invention is hereinafter disclosed, my invention consists in the improved construction and combination of parts, hereinafter fully described, illustrated in the accompanying drawings, and more particularly pointed out in the appended claims.

In the accompanying drawings, in which similar reference characters indicate similar parts in each of the views, Figure 1 is a perspective view illustrating my invention.
Fig. 2 is a cross sectional view showing the parts in position in which they are used. Fig. 3 is a cross sectional view taken through the tooth bar with the cutting bar removed and with the end shoes in position, this latter arrangement permitting the device to be used as a rake.

In the drawings, 10 designates a tubular bar of suitable length provided with alined openings on diametrically opposite sides thereof, said openings being adapted to receive teeth 11 which project downwardly from the bar and penetrate the ground as when used in connection with a cutter bar, or to serve as a rake when the bar 10 is held raised a sufficient distance by suitable means. Said bar 10 is provided with bands 12 adjustable peripherally, and being preferably split into sections secured together by suitable means such as bolts 13. Mounted on the forward bolt 13 is a plate 14 having an eye 15 to which a draft chain 15′ is secured, the latter leading to suitable swingle trees.

16 designates a cutting bar mounted in rear of the bar 10 by means of supports 17, the latter being in the form of arms curved downwardly at their rear ends, as at 18, the forward ends being removably secured to the bar 10 in any convenient manner. A brace 19 is connected to the arm to provide for securing said arm or support on opposite sides of the bar.

Projecting upwardly from the bar 10 adjacent its center, are a pair of eyes 20 which are adapted to encircle the forward ends of angle bars 21, said bars 21 having their forward ends threaded to receive nuts 22, one in advance and one in rear of the eye 20.

23 designates a brace secured to the under face of the bar 10 and having its rear end connected to an angle bar 21, two angle bars and two braces 23 being provided. As shown in Fig. 1, the rear portions of the angle bars are adapted to receive and support a platform 24, the lower faces of the angle bars forming a metallic shoe for the bottom of the platform.

As will be seen, the teeth, arms 17 and angle bars 21 are, when in operative position, practically an integral part of the bar 10 with respect to operation, the said bar acting somewhat as the axis for these parts. This arrangement becomes advantageous for controlling the parts, in connection with the angle at which the chain 15′ extends to the draft animal. For instance, the rear ends of the metallic shoes of the platform 24 are intended to ride upon the surface of the ground, this placing the weight of the operator upon the platform in advance of such rear end. As a result, such weight will tend to cause the teeth and the cutting bar to penetrate into the ground, while the angle at which the chain 15′ extends and which forms the line of draft will tend to retain the teeth and cutting bar at approximately the same level, the direction of line of draft practically counteracting the tendency to increased penetration due to the weight of the operator. If adjustment is had of the forward ends of the bars 21 so as to vary the angle of the bottom of these bars, it will be readily understood that such adjustment will slightly turn the bar 10 with the result that the line corresponding to the direction of length of the tooth will be slightly shifted thereby varying the depth at which the cutting bar operates, the rear ends of the bars 21 still remaining in contact with the ground.

As will be readily understood the teeth and arms 17 will tend to collect trash, weeds, etc., and these are removed by the operator simply stepping off the platform 24, whereupon the rear of the weeder will rise and clear the parts from this trash, etc.

By adjusting the bands 12 on the bar, the line of draft can be readily shifted, and thus compensate for difference in weight of operators or to provide more or less penetration of the teeth within the ground.

As will be seen, the cutter bar may be readily removed by simply disconnecting the arms 17, after which, suitable shoes 25 may be attached at the ends of the bar 10 by means of a clamping structure 26, this action placing the teeth 11 in position to act simply as rake teeth, the clamping action on the bar 10 preventing it from rotating and hence retaining the platform in raised position. As will be readily understood, the shoes 25 are applied in position when transporting the weeder from one point to another, the cutting bar, in such case, remaining in position.

While I have herein shown and described one way in which my invention may be carried out, it will be readily understood that changes and modifications therein may be required or desired to meet the exigencies of use, and I therefore desire it to be understood that I reserve the right to make any and all such changes or modifications as may be so necessitated or desired, in so far as the same may fall within the spirit and scope of the invention as expressed in the accompanying claims.

Having thus described my invention, what I claim as new is:—

1. A weeder comprising a bar having teeth alined longitudinally of the bar, angle bars extending rearwardly and forming a platform support, the forward ends of said bars being connected to opposite sides of the teeth carrying bar, one point of each bar being adjustable to vary the inclination of the teeth when the ends of the angle bars rest upon the ground, and bands carried by said teeth carrying bar and adjustable peripherally thereon to provide for variations in the line of draft.

2. A weeder comprising a bar having teeth alined longitudinally of the bar, angle bars extending rearwardly and forming a platform support, the forward ends of said bars being connected to opposite sides of the teeth carrying bar, one point of each bar being adjustable to vary the inclination of the teeth when the ends of the angle bars rest upon the ground, and bands carried by said teeth carrying bar and adjustable peripherally thereon to provide for variations in the line of draft, and shoes adapted to be clamped at the ends of said teeth carrying bar and adapted to support the teeth out of the ground.

3. A weeder comprising a bar having teeth alined longitudinally of the bar, angle bars extending rearwardly and forming a platform support, the forward ends of said bars being connected to opposite sides of the teeth carrying bar, one point of each bar being adjustable to vary the inclination of the teeth when the ends of the angle bars rest upon the ground, and bands carried by said teeth carrying bar and adjustable peripherally thereon to provide for variations in the line of draft, and a cutting bar carried by arms projecting rearwardly from the teeth carrying bar, said arms being removably secured in relatively fixed position on said bar, whereby adjustment of the angle bars will affect the depth of penetration of the cutting bar.

In testimony whereof I hereunto affix my signature in presence of two witnesses.

RALPH L. BENGE.

Witnesses:
 SAMUEL E. NOTSON,
 A. M. MALLORY.

Copies of this patent may be obtained for five cents each, by addressing the "Commissioner of Patents, Washington, D. C."